(12) United States Patent
Watanabe et al.

(10) Patent No.: US 8,267,541 B2
(45) Date of Patent: Sep. 18, 2012

(54) OUTDOOR ILLUMINATING DEVICE AND ILLUMINATING METHOD

(75) Inventors: Kyozo Watanabe, Osaka (JP); Hiroshi Okada, Osaka (JP); Shinji Hira, Fukuoka (JP); Kimiaki Nagatome, Hiroshima (JP)

(73) Assignees: Osaka Prefectural Government, Osaka (JP); Hiroshima Kasei Ltd, Hiroshima (JP)

( * ) Notice: Subject to any disclaimer, the term of this patent is extended or adjusted under 35 U.S.C. 154(b) by 432 days.

(21) Appl. No.: 12/445,990

(22) PCT Filed: Oct. 25, 2007

(86) PCT No.: PCT/JP2007/070858
§ 371 (c)(1),
(2), (4) Date: Jun. 5, 2009

(87) PCT Pub. No.: WO2008/050850
PCT Pub. Date: May 2, 2008

(65) Prior Publication Data
US 2010/0321930 A1 Dec. 23, 2010

(30) Foreign Application Priority Data
Oct. 25, 2006 (JP) ................................. 2006-290542

(51) Int. Cl.
*F21S 13/10* (2006.01)
*F21V 29/00* (2006.01)
*F21L 4/00* (2006.01)

(52) U.S. Cl. ........ 362/183; 362/153; 362/184; 362/231; 362/249.02; 362/431

(58) Field of Classification Search .................. 362/153, 362/431, 249.02, 183, 184
See application file for complete search history.

(56) References Cited

U.S. PATENT DOCUMENTS

| 6,220,722 B1 * | 4/2001 | Begemann ..................... 362/231 |
| 6,250,774 B1 * | 6/2001 | Begemann et al. ........... 362/231 |
| 6,942,361 B1 * | 9/2005 | Kishimura et al. ........... 362/240 |
| 7,628,508 B2 * | 12/2009 | Kita et al. ..................... 362/231 |

(Continued)

FOREIGN PATENT DOCUMENTS
JP  08-045330 A  2/1996
(Continued)

OTHER PUBLICATIONS
International Search Report for PCT/JP2007/070858.
(Continued)

*Primary Examiner* — Stephen F Husar
*Assistant Examiner* — James Cranson, Jr.
(74) *Attorney, Agent, or Firm* — Pearne & Gordon LLP

(57) ABSTRACT

An outdoor illuminating device and illuminating method using LEDs as light sources to reduce a load on the environment and effectively function as a crime deterrent to contribute to environmental design for establishing safe and secure communities. Security light (1) capable of simultaneously emitting at least two different colors of illumination light is provided with a plurality of white LEDs (16) and blue LEDs (18) as the light sources. The security light (1) comprises main lighting unit (11) positioned at a predetermined distance (D) above the ground surface (G), first illuminating part (13) for emitting illumination light of white-tint color downward in the direction substantially vertical from main lighting unit (11), and second illuminating part (14) for emitting illumination light of blue-tint color to the outside of the area substantially vertically below main lighting unit (11).

12 Claims, 9 Drawing Sheets

U.S. PATENT DOCUMENTS

| | | | | |
|---|---|---|---|---|
| 7,731,383 | B2* | 6/2010 | Myer | 362/145 |
| 7,784,980 | B2* | 8/2010 | Tsao et al. | 362/431 |
| 2006/0256568 | A1* | 11/2006 | Ellis | 362/431 |

FOREIGN PATENT DOCUMENTS

| | | |
|---|---|---|
| JP | 3498290 B1 | 12/2003 |
| JP | 2004-200102 A | 7/2004 |
| JP | 2005-235513 A | 9/2005 |
| JP | 2006-277979 A | 10/2006 |
| JP | 2007-280735 A | 10/2007 |
| KR | 10-2001-72864 A | 7/2001 |
| KR | 20-272030 U | 4/2002 |
| KR | 10-2004-89152 A | 10/2004 |
| KR | 10-2006-34768 A | 4/2006 |

OTHER PUBLICATIONS

"San Lake Park side wind view/photo log" http://blog.naver.com/dogi75?Redirect=Log&logNo=20069451852 [Aug. 2, 2012 11:30:06], Jun. 30, 2005.

"Manila others/photo long" http://blog.naver.com/jeaki002?Redirect=Log&logNo=150049620616[Aug. 2, 2012 11:55:48], Apr. 26, 2005.

"Streetlamp . . . The photograph which I took recently . . . " http://blog.naver.com/enbifar?Redirect=Log&logNo=40001670644[Aug. 2, 2012 12:03:14], Apr. 7, 2004.

"Streetlight" http://photo.naver.com/view/2005070201503903728?p.=286&view=search&sort=recent&param= [Aug. 2, 2012 19:35:32], Jul. 2, 2005.

"Streetlight on a rainy day is very beautiful!! | Room photo" http://cafe.daum.net/...id=B3N4&dataid=159&fileid=1&regdt=20060718114311&disk=3&grpcode=NIKE30&dncnt=N&JPG&srchid=11MM9Kcr200[Aug. 2, 2012 13:26:09], Jul. 18, 2006.

Alex Hibbert "Waterfront Street Lighting in Old Portsmouth, UK" Stock Photo Image, http://www.superstock.com/stock-photos-images/1811-2510[Aug. 2, 2012 19:00:05], publication date: unknown.

"Old Portsmouth" http://photos.portsmouthvideos.co.uk/gallery/main.php?g2_itemld=656[Aug. 3, 2012 21:44:50], Apr. 28, 2006.

"Old Portsmouth—looking along the hotwalls towards the Square Tower" http://photos.portsmouthvideos.co.uk/gallery/main.php?g2itemld=646[Aug. 3, 2012 21:45:47], Apr. 28, 2006.

"Old Portsmouth" http://photos.portsmouthvideos.co.uk/gallery/main.php?g2_itemld=658[Aug. 3, 2012 21:46:25], Apr. 28, 2006.

* cited by examiner (a)

(b)

(a)

(b)

OUTDOOR ILLUMINATING DEVICE AND ILLUMINATING METHOD

TECHNICAL FIELD

The present invention relates to an outdoor illuminating device and an illuminating method, and more particularly to techniques pertaining to the outdoor illuminating device and the illuminating method capable of simultaneously emitting at least two different colors of illumination light and suitable for use as a street light, security light, and the like.

BACKGROUND ART

Streets and intersections in urban areas, parking lots, parks and the like spaces are provided with outdoor illuminating devices such as street lights and security lights. While incandescent lamps, mercury-vapor lamps, fluorescent lamps and the like kinds have hitherto been used as the light sources of the outdoor illuminating devices, there is a rise of numerous ideas in recent years of illuminating devices using LEDs ("Light Emitting Diodes") as the new light sources that replace the incandescent and the other conventional lamps.

Patent reference 1 discloses, as an example, an illuminating device using white LEDs as the light source and provided with a lampshade having a concaved shape with asperities formed on the surface facing the light source for the purpose of widening an area illuminated by the light of the LEDs (refer to patent reference 1).

In addition, patent reference 2 discloses another illuminating device comprising a wide-angle LED illuminator, a middle-angle LED illuminator and a narrow-angle LED illuminator, and the individual illuminators are arranged in a manner to direct the light toward different areas across a walkway (refer to patent reference 2).

The illuminating devices using LEDs for their light sources are practical for conducting various business activities with consideration given to the environment since they can cut back power consumption and achieve reduction of loads on the environment for prevention of global warming by virtue of low thermal dissipation from the light sources. These illuminating devices also draw attention for their high durability and wide variety of luminous colors of the light sources.

Incidentally, efforts are being made in recent years to reconsider the environmental design for establishing safe and secure communities. With regard to the outdoor illuminating devices, in particular, there is a growing interest in the work aimed to controlling (or, preventing) crimes in certain areas of the community by replacing the outdoor illuminating devices (especially the security lights) with those of "blue color".

It is anticipated that provision of the security lights emitting "blue color" can prevent crimes in these areas for some conceivable reasons such as: (1) the blue color inherently has a sedative effect acting upon the parasympathetic nerves of humans as well as an effect of calming psychologically because of the general preference to it; and (2) the blue color mentally moves the potential criminals to "avoid being seen" due to the "Purkinje effect" that the blue color improves visibility in the nighttime as compared to red and orange colors.

Demonstrative experiments have already been carried out in many areas, and the interesting results have also been reported.

With the outdoor illuminating device of the conventional structure, however, there exists a problem even when the illumination light is changed simply to "blue color" that the solid blue color illuminated from the main lighting unit tends to produce uneven contrast of color tone on the ordinary road surface paved with asphalt, etc. of dark color, which has a contradicting effect of impeding the smooth traffic of pedestrians and passing vehicles in the area generally directly below the outdoor illuminating device.

There is also a problem when blue LEDs are mounted to the outdoor illuminating device of the conventional structure that it does not provide as much an effect of preventing crimes as anticipated since the directivity intrinsic to the LEDs is likely to cause color shading in certain directions of the illumination, which disturbs visually of the blue light for the pedestrians and passing vehicles at distant locations.

There are other structures as proposed by patent references 3 and 4, for instance, in the light of improving the visibility of illumination light for the passing vehicles and pedestrians at the distant locations (refer to patent references 3 and 4).

Patent reference 1: Japanese Patent, No. 3,498,290

Patent reference 2: Japanese Patent Unexamined Publication, No. 2004-116177

Patent reference 3: Japanese Patent Unexamined Publication, No. 1999-111019

Patent reference 4: Japanese Patent Unexamined Publication, No. 2003-203506

SUMMARY OF THE INVENTION

Problems to be Solved by the Invention

The present invention is intended to solve the above problems of the conventional arts related to the outdoor illuminating devices and the illuminating method, and it is thus an object of this invention to provide an outdoor illuminating device and an illuminating method that can reduce a load on the environment and effectively function as crime deterrent by using LEDs for the light sources, thereby contributing to the environmental design for establishing safe and secure communities.

Means to Solve the Problems

The above are the problems that need to be solved by this invention, and they are solved by means, which will be described hereinafter.

In other words, claim 1 discloses an outdoor illuminating device capable of simultaneously emitting at least two different colors of illumination light, the illuminating device comprising a main lighting unit provided with a plurality of LEDs as a light source and placed at a predetermined distance above the ground surface, and an illuminating part for illuminating an area substantially vertically below the main lighting unit in white color while also illuminating the main lighting unit and/or an area in the vicinity thereof in blue color.

In an aspect of claim 2, the illuminating part has a first illuminating part for emitting illumination light of white-tint color downward in the direction substantially vertical from the main lighting unit, and a second illuminating part for emitting illumination light of blue-tint color to the outside of the area substantially vertically below the main lighting unit.

In an aspect of claim 3, the first illuminating part is provided with white LEDs as a light source.

In claim 4, the second illuminating part is provided with blue LEDs as a light source.

In claim 5, the second illuminating part is disposed in a continual fashion along the periphery of the first illuminating part.

In claim 6, the second illuminating part is disposed at two confronting sides of the first illuminating part.

In claim 7, the main lighting unit is fixed directly to a post.

In claim 8, the main lighting unit is fixed to a post with a mounting fixture having an adjustable means for changing an angle of the main lighting unit relative to the ground surface.

In claim 9, a plurality of the main lighting units are fixed to one post in a manner that each of the main lighting units is positioned at a different predetermined distance in height from the ground surface.

In another aspect of the illuminating device in claim 10, an automatic electric storage means having a photovoltaic cell is further provided.

Claim 11 discloses an illuminating method for simultaneously emitting at least two different colors of illumination light, the method employing a main lighting unit placed at a predetermined distance above the ground surface and provided with an illuminating part having a plurality of LEDs as a light source for illuminating an area substantially vertically below the main lighting unit in white color while also illuminating the main lighting unit and/or an area in the vicinity thereof in blue color.

Advantage of the Invention

The present invention can cut back power consumption because of the light source using LEDs, and achieve reduction of a load on the environment such as to alleviate global warming by virtue of low thermal dissipation from the light source.

In addition, the invention can give expectations for the effect of crime deterrence since the main lighting unit and the area of its vicinity are clearly visible in "blue color" from distant locations, while the bright illumination in white color in the area generally vertically below the main lighting unit does not impede but facilitate smooth traffic of pedestrians and vehicles passing under the main lighting unit.

The invention can hence contribute to the environmental design for establishing safe and secure communities by way of providing these "blue color" illuminating devices in numbers of areas in the communities.

REFERENCE MARKS IN THE DRAWINGS

1 Security light (outdoor illuminating device)
10 Post
11 Main lighting unit
13 First illuminating part
14 Second illuminating part
16 white LED
18 blue LED
G Ground surface
D Predetermined distance

DETAILED DESCRIPTION OF THE PREFERRED EMBODIMENTS

Description is provided hereinafter of the preferred modes for carrying out the present invention.

Figure 1:
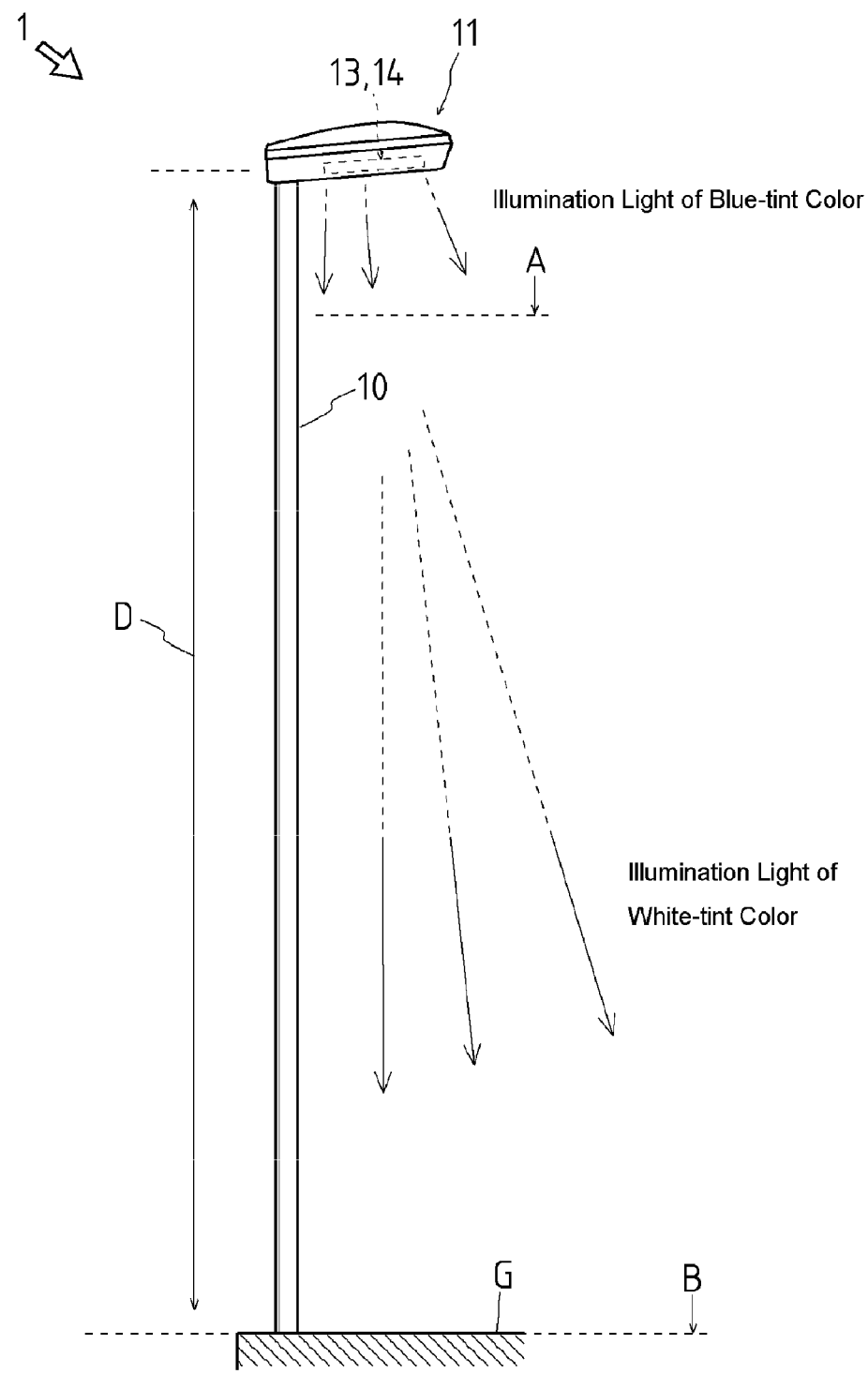
FIG. 1 is a side view depicting an overall structure of a security light according to one exemplary embodiment of the present invention.
Figure 2:
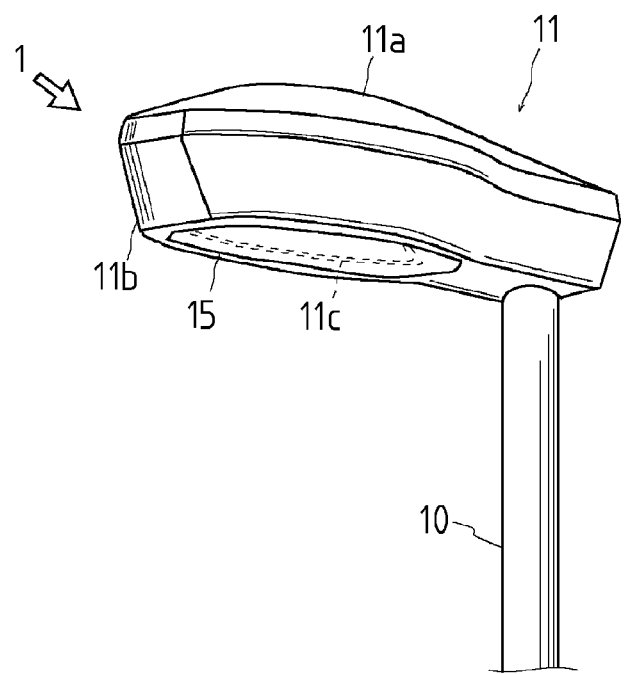
FIG. 2 is a perspective view of a main lighting unit.
Figure 3:
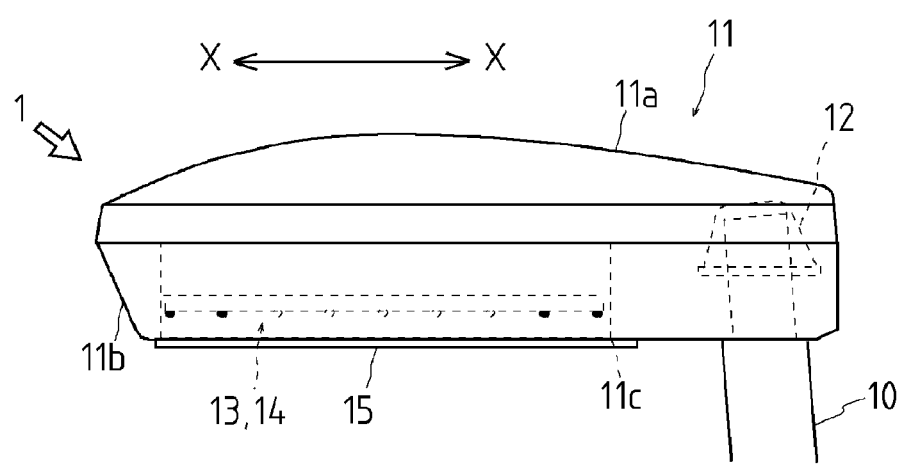
FIG. 3 is a side view of the main lighting unit.
Figure 4:
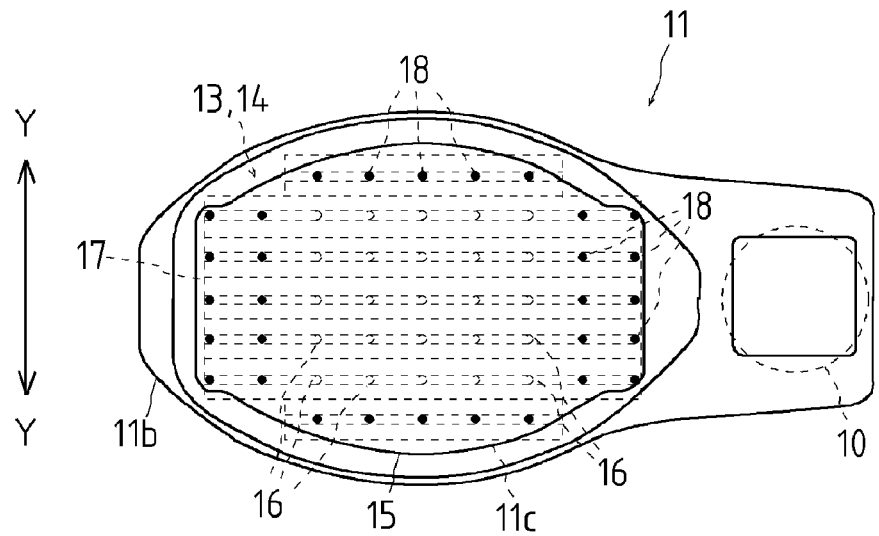
FIG. 4 is a bottom view of the main lighting unit.
Figure 5:
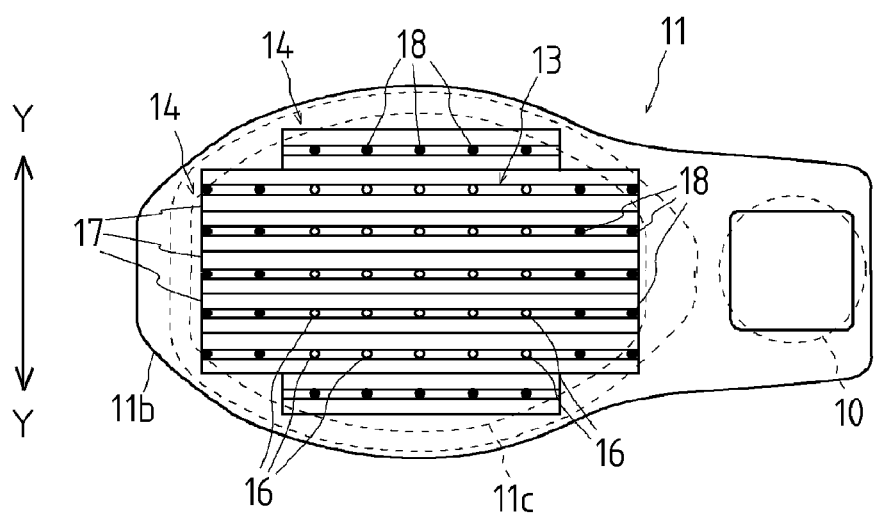
FIG. 5 is another bottom view of the main lighting unit shown in FIG. 4.
Figure 6:
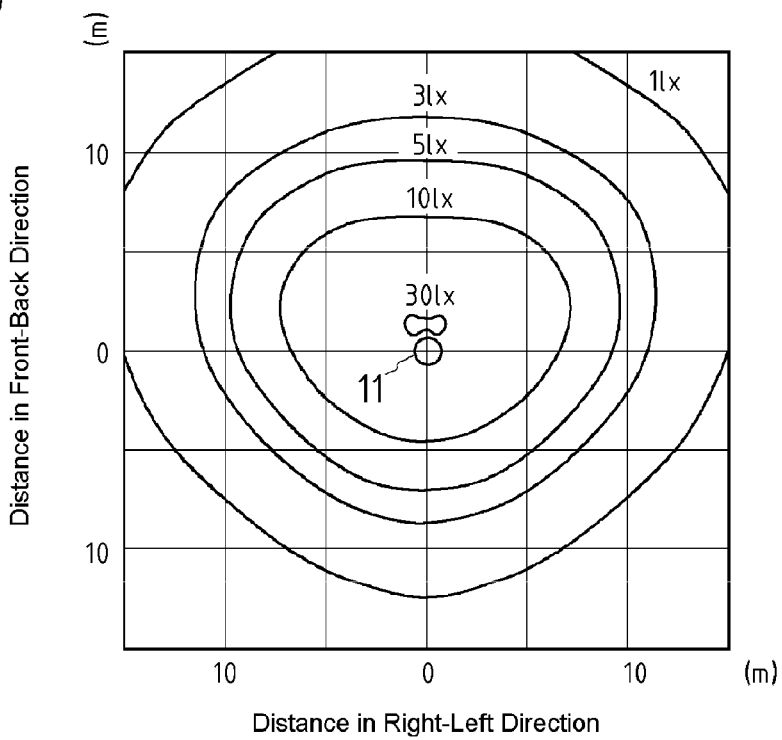
FIG. 6 shows illuminance distribution maps in the horizontal plane of illumination light emitted from the main lighting unit.
Figure 6:
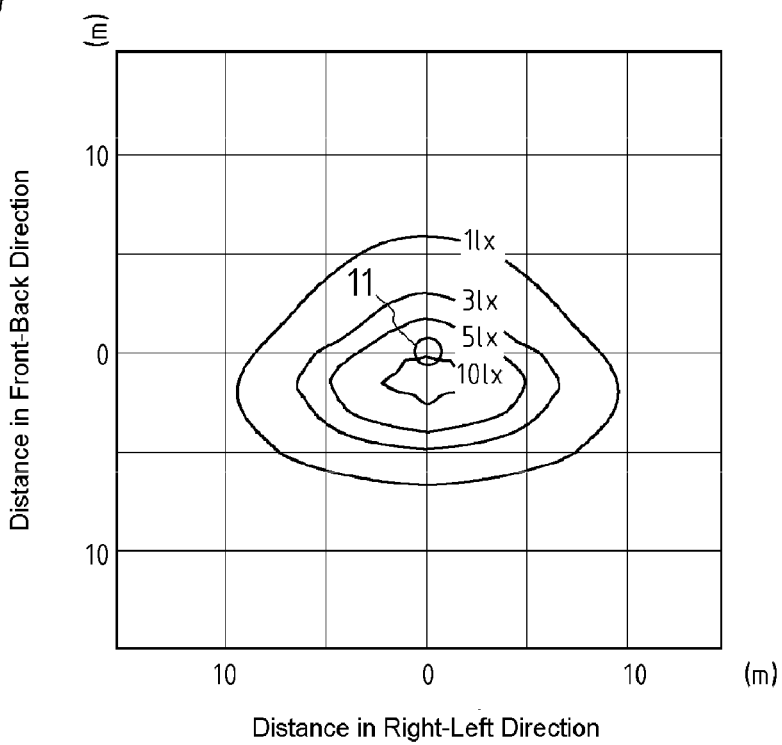
Figure 7:
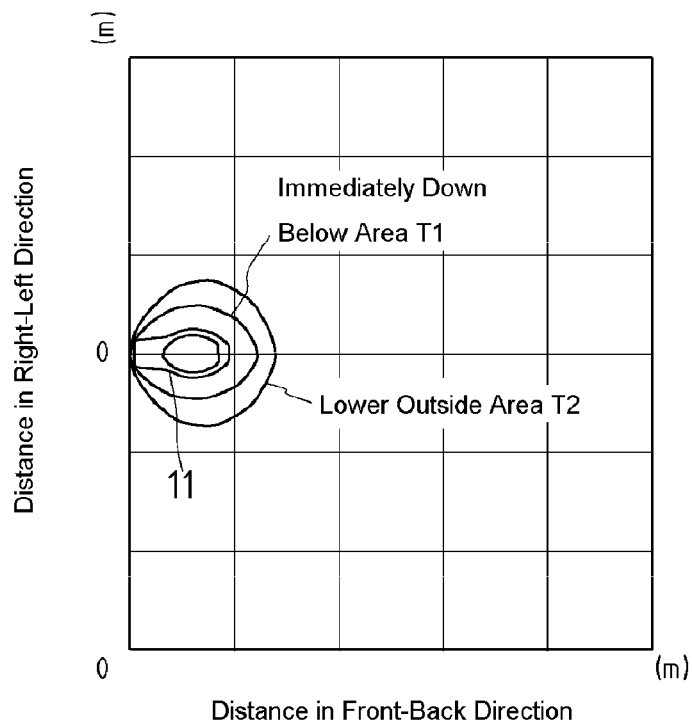
FIG. 7 shows imaginary distribution maps of illumination light emitted from the main lighting unit.
Figure 7:
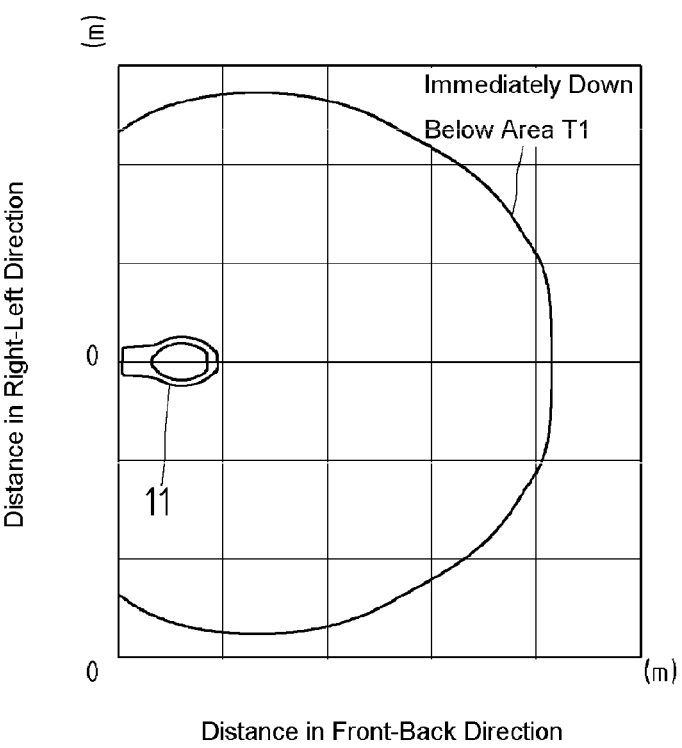
Figure 8:
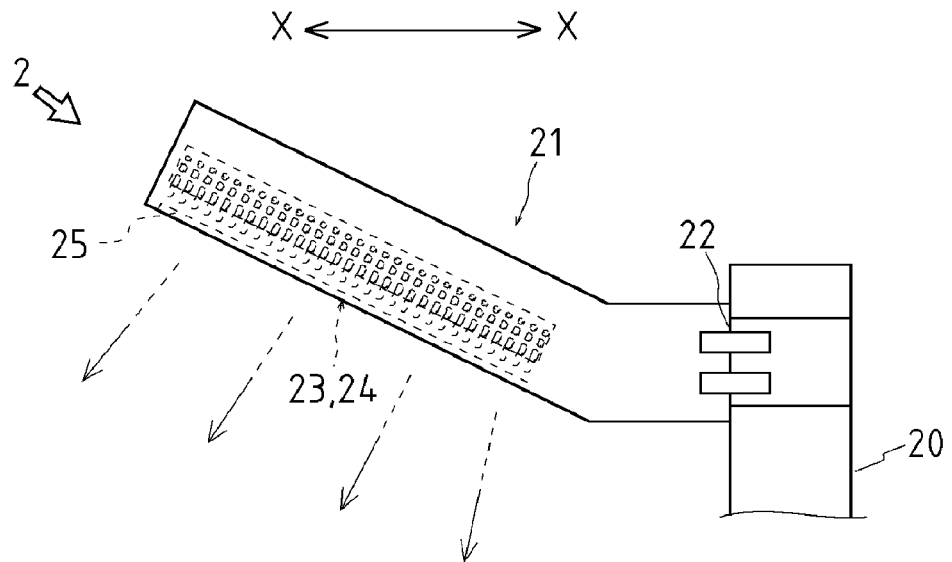
FIG. 8 is a side view depicting a main lighting unit of a security light according to another exemplary embodiment.
Figure 9:
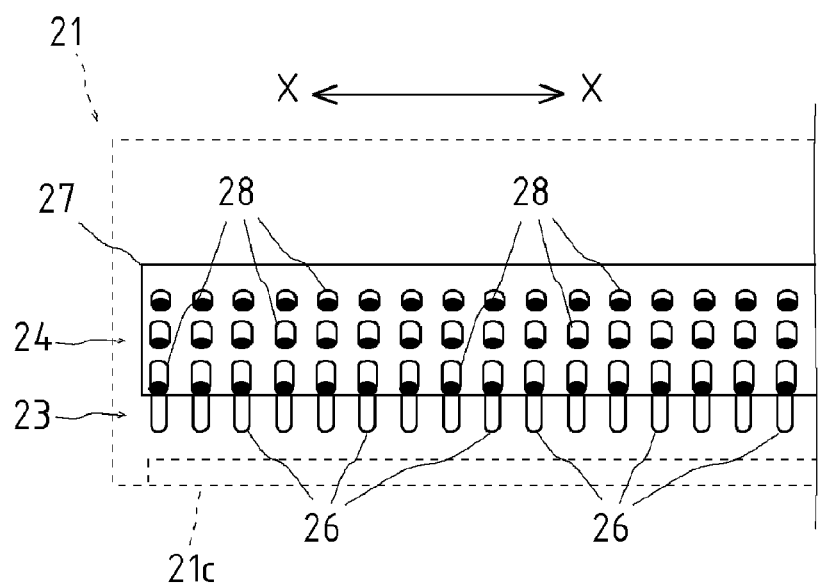
FIG. 9 is another side view of the main lighting unit shown in FIG. 8.
Figure 10:
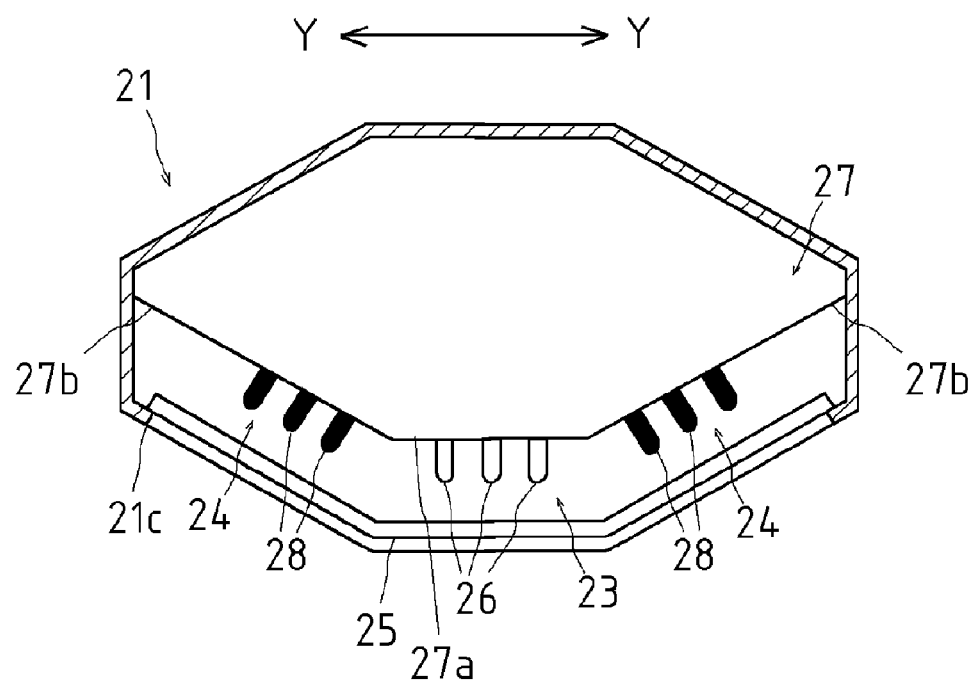
FIG. 10 is a sectioned front view of the main lighting unit shown in FIG. 8.
Figure 11:
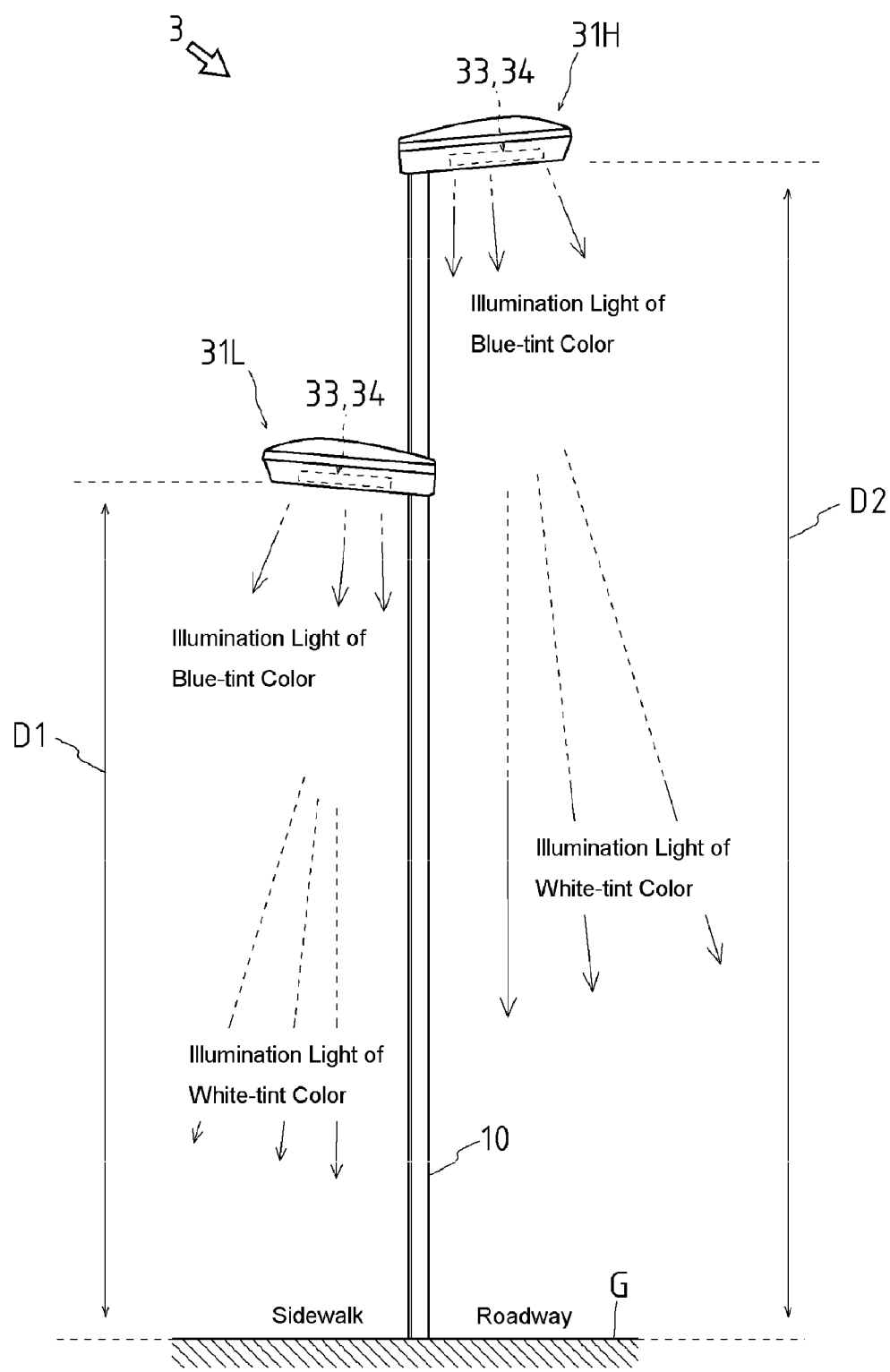
FIG. 11 is a side view depicting an overall structure of a two-in-one street light for both sidewalk and roadway according to still another exemplary embodiment.
Figure 12:
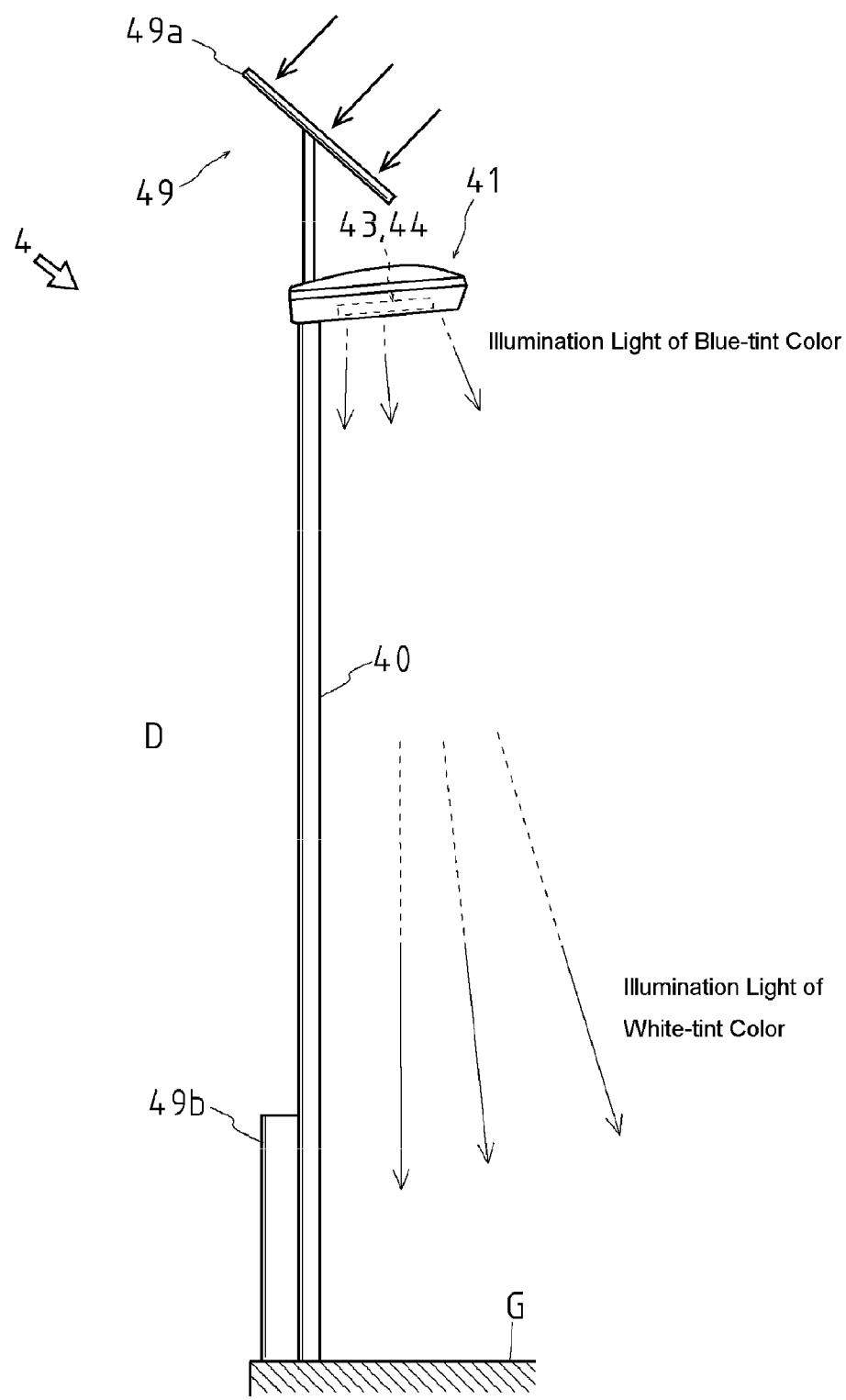
FIG. 12 is a side view depicting an overall structure of the security light of FIG. 1 provided with a photovoltaic power generation system.

FIG. 1 is a side view depicting an overall structure of a security light according to one exemplary embodiment of the invention, FIG. 2 a perspective view of a main lighting unit, FIG. 3 a side view of the main lighting unit, FIG. 4 a bottom view of the main lighting unit, FIG. 5 another bottom view of the main lighting unit shown in FIG. 4, FIG. 6 illuminance distribution maps in the horizontal plane of illumination light emitted from the main lighting unit, FIG. 7 imaginary distribution maps of illumination light emitted from the main lighting unit, FIG. 8 a side view depicting a main lighting unit of a security light according to another exemplary embodiment, FIG. 9 another side view of the main lighting unit shown in FIG. 8, FIG. 10 a sectioned front view of the main lighting unit shown in FIG. 8, FIG. 11 a side view depicting an overall structure of a two-in-one street light for both sidewalk and roadway according to still another exemplary embodiment, and FIG. 12 a side view depicting an overall structure of the security light of FIG. 1 provided with a photovoltaic power generation system.

The description provided in the following exemplary embodiments covers security light 1 as a representative of outdoor illuminating devices, and these exemplary embodiments are therefore illustrative and not restrictive. Other aspects and details of the related embodiments will be described in the later part (refer to FIG. 8 to FIG. 12).

Description provided first pertains to an overall structure of the outdoor illuminating device of this exemplary embodiment.

As shown in FIG. 1 and FIG. 2, the outdoor illuminating device of this exemplary embodiment is represented by security light 1 comprising main lighting unit 11 having a plurality of LEDs 16 and 18 as the light sources and placed at a predetermined distance D above the ground surface, and illuminating parts 13 and 14 for illuminating an area substantially vertically below main lighting unit 11 in white color while also illuminating main lighting unit 11 and/or an area in the vicinity thereof in blue color. Security light 1 is set up on the ground surface G with main lighting unit 11 fixed to vertically mounted post 10.

It is to be noted that a direction shown by arrow X in FIG. 3 and another direction shown by any of arrows Y in FIG. 4 and FIG. 5 are defined as a front-back direction and a right-left direction respectively of main lighting unit 11.

Post 10 is an upright pole made of a stainless steel, and main lighting unit 11 is mounted to the top end thereof. This post 10 is used as a security light strut in this exemplary embodiment and it is set up at or around the shoulder of a roadway or a sidewalk in a manner to protrude main lighting unit 11.

Main lighting unit 11 formed of aluminum by die-casting (or, made of stainless steel) comprises upper unit body 11a and lower unit body 11b, which are assembled into one unit. Upper unit body 11a is formed into generally an upwardly convex dome-like configuration having generally an oval shape in the plan view, and one end along its front-back direction is connected to post 10 with mounting fixture 12. Lower unit body 11b is attached to upper unit body 11a to cover a lower face and lower side periphery of upper unit body 11a. Lower unit body 11b has opening 11c of generally an oval shape in the plan view.

There are two illuminating parts 13 and 14 provided in a space between upper unit body 11a and lower unit body 11b (refer to FIG. 3, et al.), and these illuminating parts 13 and 14 emit illumination light downward through opening 11c. Globe 15 (i.e., transparent cover) is attached to opening 11c in a manner to cover illuminating parts 13 and 14 from the underside so that the illumination light from illuminating parts 13 and 14 passes therethrough. Globe 15 is formed of a colorlessness transparent material such as acrylic resin, and it is attached to opening 11c in a removable fashion.

Main lighting unit 11 is fixed to the top end of post 10 by means of mounting fixture 12 with opening 11c facing downward, and more specifically, it is fixed in such an orientation that the front-back axis is slightly tilted upward about mounting fixture 12. Main lighting unit 11 set in this orientation is positioned at a height of predetermined distance D from ground surface G. This predetermined distance D is set as appropriate according to a location of installation, illuminance and brightness of illuminating parts 13 and 14, and the like. Security light 1 of this exemplary embodiment can by used with main lighting unit 11 positioned at a vertical height of 3 m to 8 m above the ground surface G.

Lighting parts 13 and 14 are so constructed that first illuminating part 13 emits illumination light of white-tint color toward the area substantially vertically below main lighting unit 11, and second illuminating part 14 emits illumination light of blue-tint color to the outside of the area substantially vertically below main lighting unit 11. As discussed here, security light 1 of this exemplary embodiment has the function of emitting two colors, or white-tint color and blue-tint color of illumination light at the same time since it comprises first illuminating part 13 for emitting the illumination light of white-tint color and second illuminating part 14 for emitting the illumination light of blue-tint color (refer to FIG. 1).

In this context, the term "white-tint color" means any color having a tone between pure-white color and light grayish color, and the term "blue-tint color" means any blue-tinted color such as indigo blue and violet beside pure blue color.

As shown in FIG. 3 to FIG. 5, first illuminating part 13 is disposed in generally a center area within the space formed between upper unit body 11a and lower unit body 11b, and it forms a flat illuminating portion of an outer configuration similar to a horizontally sectioned shape of main lighting unit 11. More specifically, first illuminating part 13 comprises a plurality of white LEDs 16 serving as the light source and LED substrates 17 whereon the individual white LEDs 16 are mounted.

White LEDs 16 are formed into a bullet-like shape, and mounted at generally equal intervals along rows of houndstooth check or checkerboard pattern on a number of LED substrates 17 so that LEDs 16 are aligned in the same plane of LED substrates 17 in a protruding manner.

LED substrates 17 are wiring boards of a well-known type formed into a long strip, and mounting holes (not shown) are provided at regular intervals for electrical connections with lead terminals of white LEDs 16. White LEDs 16 are inserted in their respective mounting holes of predetermined locations on LED substrates 17 and secured with solder or the like means.

First illuminating part 13 of this exemplary embodiment comprises the number of LED substrates 17 arranged at generally equal intervals across the right-left direction of main lighting unit 11, each of which LED substrates 17 bears a number of white LEDs 16 mounted in alignment at generally equal intervals along the front-back direction of the long strip.

Second illuminating part 14 is disposed in a continual fashion along the outer periphery of afore-said first illuminating part 13 so that it encircles first illuminating part 13, and it forms a flat illuminating portion of an outer configuration similar to the horizontally sectioned shape of main lighting unit 11. More specifically, second illuminating part 14 comprises a plurality of blue LEDs 18 serving as the light source and a number of LED substrates 17 shared by and used for first illuminating part 13, for mounting the individual blue LEDs 18.

Blue LEDs 18 are also formed into the bullet-like shape, and mounted at generally equal intervals along rows of the houndstooth check or checkerboard pattern on the number of LED substrates 17 so that blue LEDs 18 are aligned in the same plane of LED substrates 17 in a protruding manner. Blue LEDs 18 of this exemplary embodiment in particular, are mounted at generally equal intervals in a row along each of LED substrates 17 (into mounting holes thereof) disposed at both sides in the right-left direction of main lighting unit 11 as well as the front ends and the back ends of those LED substrates 17 (into mounting holes thereof) disposed at the center area of opening 11c.

In main lighting unit 11 of this exemplary embodiment, as discussed above, white LEDs 16 of first illuminating part 13 are arranged in generally the center area of opening 11c, and blue LEDs 18 of second illuminating part 14 are arranged in a manner to encircle around first illuminating part 13 (white LEDs 16).

There is also a power supply unit for delivering power to both groups of white LEDs 16 and blue LEDs 18 through LED substrates 17 although not shown in these figures.

It is desirable to use LEDs of a type having an outstanding luminous characteristic capable of producing an ultra-high luminous intensity (10.00 to 35.00 cd at 25° C. and 20 mA) for white LEDs 16. On the other hand, general-purpose LEDs should suffice for the purpose of blue LEDs 18. In other words, first illuminating part 13 requires the LEDs of ultra-high luminous intensity to ensure a sufficient level of illumination on the ground surface G even when the predetermined distance D from the ground surface G becomes greater since white LEDs 16 are used as the light source of street lighting for illuminating mainly the ground surface G for pedestrians and running vehicles, as will be described later. On the other hand, the use of general-purpose LEDs is suitable to properly illuminate main lighting unit 11 and the proximity thereof with "blue color" since blue LEDs 18 are the light source of second illuminating part 14 for illuminating the proximal area around main lighting unit 11 for the main purpose of crime prevention.

In this exemplary embodiment, security light 1 is so adjusted that it provide a mean illuminance value in a range of 3 to 50 luxes in a horizontal plane depending on location of installation and predetermined distance D in height from the ground surface G. For example, it is adjusted to 30 luxes or higher illuminance value at least in the area directly below the lighting unit when installed on a road of heavy traffic, or to a range of 3 to 10 luxes when installed on a road of light traffic. It is also adjusted to about 5 to 40 luxes in a general shopping district and urban area, or 1 to 10 luxes in a residential area.

FIG. 6 shows illuminance distribution maps in the horizontal plane of illumination light emitted from main lighting unit 11. More specifically, FIG. 6(a) shows the illuminance distribution map when main lighting unit 11 is positioned at approximately 7.0 m above the ground surface G, and FIG. 6(b) shows another illuminance distribution map when main lighting unit 11 is positioned at approximately 4.5 m above the ground surface G.

In the case of security light 1 having main lighting unit 11 positioned at approximately 7.0 m above the ground surface G, in particular, first illuminating part 13 is provided with white LEDs 16 of ultra-high luminous intensity for the light source. The illuminance distribution in the horizontal plane shows that an illuminance value of 30 luxes is attained at the area substantially vertically below, and the illuminance falls off gradually to 10 luxes, 5 luxes, 3 luxes and 1 lux with increase in radius toward outside (FIG. 6(a)). As shown, this security light 1 is suitable for installation in the shoulder or the vicinity of a roadway having heavy traffic for street lighting since it can provide sufficient illumination over a wide area in the front-back direction (±15 m) and right-left direction (±15 m) of main lighting unit 11 while also attaining 30 luxes of illuminance at the area immediately below.

In the case of another security light having main lighting unit 11 positioned at approximately 4.5 m above the ground surface G, the illuminance distribution in the horizontal plane shows that an illuminance value of 10 luxes is attained at the area substantially vertically below, and the illuminance falls off gradually to 5 luxes, 3 luxes and 1 lux with increase in radius toward outside (FIG. 6(b)). This security light 1 is therefore useful for installation in the shoulder or the vicinity of a sidewalk mainly in the residential area.

According to this exemplary embodiment, security light 1 is so constructed that first illuminating part 13 emits illumination light of white-tint color toward the area substantially vertically below main lighting unit 11 (this area is referred to hereinafter as "immediately down below area T1"), and second illuminating part 14 emits illumination light of blue-tint color to the outside of the area substantially vertically below main lighting unit 11, i.e., an area outside of the immediately down below area T1 (this area is now referred to as "lower outside area T2"). More concretely, it is desirable that main lighting unit 11 is so constructed that when it is fixed with its opening 11c positioned downward white LEDs 16 face substantially vertically downward and blue LEDs 18 face rather outside from the substantially vertically down below (refer to FIG. 8 to FIG. 10 as will be described later).

It is preferred in this exemplary embodiment that the illumination light from second illuminating part 14 is directed outward rather than substantially vertically below main lighting unit 11, but more preferably, the illumination light is emitted outward in the direction given as $0°<\theta\leq90°$ wherein $\theta$ is an angle (not shown in the figures) formed between the direction of the illumination light from second illuminating part 14 and the substantially vertical axis from the center of main lighting unit 11. For example, second illuminating part 14 may be so disposed as to face the both sides of main lighting unit 11 (i.e., lower unit body 11b) to allow it emit the illumination light toward generally horizontally instead of the afore-said exemplary embodiment, in which both first illuminating part 13 and second illuminating part 14 are disposed in the same flat plane to let the illumination light emitted in the same direction of substantially vertically below them.

FIG. 7 shows imaginary distribution maps of illumination light emitted from main lighting unit 11. More specifically, FIG. 7(a) shows the imaginary distribution map of illumination light in horizontal plane A in the proximity of main lighting unit 11, and FIG. 7(b) shows another imaginary distribution map of illumination light in horizontal plane B in the vicinity of ground surface G.

In this exemplary embodiment, the illumination light of white-tint color emitted from illuminating part 13 produces an illuminance distribution of white-tint color in the immediately down below area T1 around the proximity of main lighting unit 11, and the illumination light of blue-tint color emitted from second illuminating part 14 produces an illuminance distribution of blue-tint color in the lower outside area T2 (FIG. 7(a)). When security light 1 of such illuminating condition is viewed from a distant location, it can be perceived visually that main lighting unit 11 and the area in the lower vicinity of it are illuminated in blue color. Second illuminating part 14 for illuminating main lighting unit 11 and its proximal area with "blue color" thus has the function of the lighting unit for crime deterrence.

In the vicinity of ground surface G, on the other hand, the immediately down below area T1 expands outwardly as compared to that in the proximity of main lighting unit 11, and the illumination light distributed here mainly becomes white-tint color only (FIG. 7(b)). When pedestrians and running vehicles approach gradually toward security light 1 of this illuminating condition, and pass under main lighting unit 11, for instance, the area of ground surface G immediately down below main lighting unit 11 and the vicinity is illuminated in white color by the illumination light of white-tint color. First illuminating part 13 thus has the function of street lighting unit for illuminating mainly the ground surface G of a sidewalk and roadway for the pedestrians and the running vehicles.

As illustrated above, security light 1 of this exemplary embodiment is an outdoor illuminating device capable of simultaneously emitting at least two different colors of illumination light, comprising main lighting unit 11 provided with the plurality of white LEDs 16 and the plurality of blue LEDs 18 as the light sources and placed at predetermined distance D above ground surface G, and the illuminating part for illuminating an area substantially vertically below main lighting unit 11 in white color while also illuminating main lighting unit 11 and an area in the vicinity thereof in blue color, wherein the illuminating part comprises first illuminating part 13 for emitting illumination light of white-tint color toward the area substantially vertically below main lighting unit 11, and second illuminating part 14 for emitting illumination light of blue-tint color to the outside of the area substantially vertically below main lighting unit 11.

The structure employed as illustrated can achieve reduction of a load on the environment and effectively function as the crime deterrent, and it can hence contribute to the environmental design for establishing safe and secure communities.

In other words, security light 1 of this exemplary embodiment can cut back power consumption because of the use of white LEDs 16 and blue LEDs 18 as the light sources, and achieve reduction of a load on the environment such as to alleviate global warming by virtue of low thermal dissipation from the light sources. To be more specific, it can contribute to the measures for preventing global warming by the reduction of heat dissipation from the light sources (e.g., measures to solve the heat-island problem), measures to promote energy saving business by reducing the power consumption as well as their pervasive effect of supporting the business of reducing carbon dioxide emissions, and it is therefore effective to use security light 1 of this exemplary embodiment in conducting various business activities with consideration given to the environment.

One particular advantage of security light 1 of this exemplary embodiment is the use of LEDs as the light sources, which helps reduce the power consumption by 10 to 15% as compared to the conventional security light equipped with fluorescent lamps and the like, while also achieving a substantial reduction in the maintenance cost due to their extended serviceable life. Security light 1 of this exemplary embodiment, when installed in place of the conventional security light, can provide a sufficient amount of saving by the reduction in cost of the power consumption that it becomes possible to cover the restoration cost within few years.

Moreover, it is possible to reduce further the maintenance cost of main lighting unit 11 and the light sources (white LEDs 16 and blue LEDs 18) since the light sources of LEDs are less likely to attract small insects.

In addition, it is anticipated that security light 1 of this exemplary embodiment has the effect of crime deterrence since it has the illumination light of blue-tint color to illuminate main lighting unit 11 and the proximal area in blue color so that it can be conceived as "blue color" security light 1 illuminating main lighting unit 11 and the proximal area in blue when viewed from distant locations. Since security light 1 also illuminates the ground surface G and the vicinity thereof with white-tint color, it has no effect of impeding the smooth traffic of pedestrians and vehicles passing under security light 1. The above features can contribute to the environmental design for establishing safe and secure communities by way of providing these "blue color" security lights 1 in numbers of areas in the communities and using their function of crime deterrent effect.

In security light 1 of this exemplary embodiment, second illuminating part 14 is disposed in a continual fashion along the outer periphery of first illuminating part 13 such that blue LEDs 18 are arranged in a manner to encircle white LEDs 16 in the center. This structure can separate the two colors of the illumination light efficiently by virtue of the high directivity (rectilinear propagation) intrinsic to the LEDs. This is especially effective for second illuminating part 14 to emit the illumination light of blue-tint color to all directions, thereby improving the visibility of main lighting unit 11 and the proximal area in "blue color".

Security light 1 of this exemplary embodiment has main lighting unit 11 fixed directly to post 10, which eliminates the need to use any member such as a mounting arm between post 10 and main lighting unit 11 so as to help reduce a number of structural components and the manufacturing cost of security light 1.

It is desirable that security lights 1 constructed as illustrated above are installed in the areas where street crimes have taken place or occurrences of such crimes are unavoidable. Areas such as urban streets and intersections, parking lots and parks are specific examples. A substantial effect can be expected especially when these areas are subjected to environmental redesigning as model areas for crime deterrence.

It should be understood that the outdoor illumination device of this invention can be embodied in various other forms, and the structure of security light 1 presented above are therefore illustrative and not restrictive.

Another exemplary embodiment illustrated and described herein below has certain similarities to the previous embodiment in the structure of main lighting unit 11 and the like. Description being provided below will focus mainly on the structurally different parts whereas detailed explanations will be skipped for those of generally identical parts.

In the above-discussed exemplary embodiment, lower unit body 11b constituting main lighting unit 11 is described as being formed of an opaque material such as die-cast aluminum, it is not meant to restrict the material, but it may be formed of any transparent material such as a translucent acrylic resin. The structure so composed can increase an amount of the blue illumination light emitted from second illuminating part 14 toward both the right and left sides and further improve the illuminance level of main lighting unit 11 in "blue color" observed from distant locations.

In should also be understood that the outdoor illumination device of this invention can be embodied in still various other forms, such that the arrangement of first illuminating part 13 and second illuminating part 14 as well as the arrangement and number of the individual LEDs (i.e., white LEDs 16 and blue LEDs 18) presented above are illustrative and not restrictive.

In the above-discussed exemplary embodiment, although second illuminating part 14 is specifically illustrated as being disposed in a continual fashion along the outer periphery of first illuminating part 13 (refer to FIG. 4, et al.), it may be disposed at least around two confronting sides, preferably both the right and left sides of first illuminating part 13 (refer to FIG. 8 to FIG. 10). Second illuminating part 14 disposing in this manner can let it emit the illumination light of blue-tint color from both sides of main lighting unit 11 in the right and left directions toward the outside, so as to ensure the "blue color" clearly visible for anyone approaching security light 1 from the distance.

Moreover, in the above-discussed exemplary embodiment, first illuminating part 13 and second illuminating part 14 are illustrated as being constructed into a flat shape of similar configuration as the horizontally sectioned shape of main lighting unit 11 (refer to FIG. 4). However, they may be altered in shape so that white LEDs 16 are mounted in an orientation facing substantially vertically downward and blue LEDs 18 are mounted in another orientation facing outward evidently away from the downward direction due to the mounting structure when main lighting unit 11 is positioned with its opening 11c facing downward. For example, LED substrates 17 are formed into generally a semicircular shape in the cross section by making the center section protrude downward with respect to the both sides in the right-left direction so that the individual LEDs 16 and 18 are mounted along the shape of LED substrates 17 (i.e., curved surface).

Furthermore, security light 2 has a structure provided with LED substrate 27, as shown in FIG. 8 to FIG. 10, which may have a prolonged plate-like shape of a size covering opening 21c formed in main lighting unit 21, and having both right and left side portions bent upward into a reverse-trapezoidal configuration in the vertically sectioned view. This LED substrate 27 has first illuminating part 23 formed on horizontal portion 27a and second illuminating part 24 formed on a pair of obliquely bent portions 27b respectively. Each of illuminating parts 23 and 24 comprises LEDs 26 and 28 respectively mounted to LED substrate 27 at generally equal intervals of a predetermined space along the front-back direction.

In this structure, first illuminating part 23 and second illuminating part 24 are so arranged that an angle θ formed between a horizontal surface of first illuminating part 23 (i.e., the surface of horizontal portion 27a of LED substrate 27) and each of other surfaces of second illuminating part 24 (i.e, the surfaces of obliquely bent portions 27b of LED substrate 27) becomes inside of a range given as in order to have at least second illuminating part 24 emit the illumination light in the directions outward rather than substantially vertically below main lighting unit 21. The structure constructed as above can direct the illumination light of first illuminating part 23 toward substantially vertically below main lighting unit 21 and the illumination light of second illuminating part 24 toward the outsides of main lighting unit 21 than the direction of the illumination light from first illuminating part 23.

That is, in this structure, first illuminating part 23 disposed in generally the center portion emits the illumination light toward substantially vertically down below whereas second illuminating part 24 disposed in both the right and the left side portions emit the illumination light toward obliquely lower outsides relative to the vertically down below. Second illuminating part 24 (or blue LEDs 28) can illuminate main lighting unit 21 and/or the proximity thereof more effectively by making it emit the illumination light of blue-tint color toward obliquely lower outsides of main lighting unit 21 in the manner as discussed above.

In the above exemplary embodiment, second illuminating part 14 has a structure comprising the light sources of blue LEDs 18 so arranged as to emit the illumination light of blue-tint color. This structure may be so altered, however, that white LEDs 16 are used for the light sources of second illuminating part 14, and globe 15 attached to cover illuminating parts 13 and 14 is colored in part where only the illumination light from second illuminating part 14 passes through with a bluish paint, or white LEDs 16 are colored by coating them directly with the bluish paint, for instance, thereby making the illumination light emitted from second illuminating part 14 become blue-tint color.

In addition, first illuminating part 13 and second illuminating part 14 may be provided with a reflector plate (not shown) for reflecting the illumination light from the light sources (i.e., white LEDs 16 and blue LEDs 18) toward a predetermined direction. Such a reflector plate can be attached to an upper surface of LED substrate 17 in a manner so that the tips of white LEDs 16 and blue LEDs 18 are protruded from the reflector plate to ensure efficient reflection of the illumination light. It is also possible to planish the surface of LED substrate 17 into a mirror-like surface as an alternative means to the use of a reflector plate.

In the previously discussed exemplary embodiment, although mounting fixture 12 provided on main lighting unit 11 is constructed to fix main lighting unit 11 (i.e., upper unit body 11a) in an unadjustable stationary manner to post 10 (refer to FIG. 3), it may have a structure to make main lighting unit 11 adjustable for changing the relative angle in horizontal and vertical directions with respect to the ground surface G. Such a structure helps create the best lighting environment corresponding to the location of installation without placing any restriction on the location where security light 1 is installed.

Another exemplary embodiment is two-in-one street light 3 for both sidewalk and roadway, as shown in FIG. 11, wherein a plurality of main lighting units 31L and 31H are fixed to single post 30 in a manner that they are positioned at different heights designated as predetermined distances D1 and D2 respectively from the ground surface. Street light 3 of this structure has a dual-purpose usage to serve as a sidewalk light and a street light when installed at the boundary between a sidewalk and a roadway, for instance, in a manner to direct main lighting unit 31L toward the sidewalk and main lighting unit 31H toward the roadway, so as to reduce the installation cost as compared with the case requiring installation of two street lights individually.

Street light 3 comprises, to be more specific, a pair of main lighting units 31L and 31H fixed to single post 30 at positions of different predetermined distances D1 and D2 respectively in their heights from the ground surface G and they are directed to opposite sides in the same vertical plane, such that main lighting unit 31L at one side is located at the lower position (i.e., predetermined distance D1) for lighting the sidewalk and main lighting unit 33H at the other side is located at the higher position (i.e., predetermined distance D2, where D2>D1) for lighting the roadway. In this case, predetermined distance D1 of main lighting unit 31L and predetermined distance D2 of main lighting unit 33H are adjusted to be about 3 to 4 m and about 6 to 8 m respectively.

Main lighting units 31L and 31H are provided with their respective illuminating parts that produce the luminous intensities sufficient to meet the illuminance standard for the sidewalk and the roadway. The white LEDs provided in main lighting unit 31H, in particular, are the type of high luminous intensity as opposed to those provided in main lighting unit 33L, and they can provide an illuminance value of at least 30 luxes.

The number of main lighting units 31L and 31H and their positions are not restricted by the above embodiment, that one pair of main lighting units may be positioned in such directions as to form an angle of generally the letter V in the plan view for instance, or three or more main lighting units can be fixed to one post.

In still another exemplary embodiment, as shown in FIG. 12, security light 4 may be provided with photovoltaic power generation system 49 using a photovoltaic cell as an automatic electric storage means.

More specifically, photovoltaic power generation system 49 comprises solar panel 49a having photovoltaic cells assembled into a module and mounted to the top end of post 40 in a directionally movable manner, and storage unit 49b for storing electric power from solar panel 49a. The electric power stored in storage unit 49b is supplied to main lighting unit 41 as a power for the light source (i.e., LEDs). Solar panel 49a, storage unit 49b and the like components are interconnected with conductor wires, though not shown in the figure. Photovoltaic power generation system 49 provided as shown contributes to power saving since the electric power necessary for the nighttime lighting can be supplied by the solar energy. In addition, it can make the task of designing streets and their environment easier since it requires no cable-laying construction and thereby permitting installation almost anywhere.

It is therefore desirable for security lights 4 of this type to be installed in such locations as places where the cable-laying work is difficult in the case of conventional security lights, places of refuge from disaster, places for emergency evacuation and the like.

Furthermore, security light 4 provided with photovoltaic power generation system 49 discussed above may also be equipped with one or more of components selected from the group consisting of a communication camera capable of recording images and voices for surveillance and conversation, a combination of revolving light and panic button as alarming means to inform abnormal events, a wired or wireless telecommunications system capable of communicating with a main server in the headquarters and the like, in addition to photovoltaic power generation system 49, and used as a security light with call-recording function (so-called "super security light"). This exemplary embodiment is especially capable of illuminating an object located in and around the area vertical below by emitting the illumination light of white-tint color to the area below the main lighting unit 11, thereby enabling the above-said communication camera to record clear images.

INDUSTRIAL APPLICABILITY

The present invention is applicable for street lights, security lights, and the like for use as outdoor illuminating devices capable of simultaneously emitting at least two different colors of illumination light, and contribute to the environmental design for establishing safe and secure communities by way of providing them as "blue color" illuminating devices.

The invention claimed is:

1. An outdoor illuminating device having capability of simultaneously emitting at least two different colors of illumination light, the device comprising:
a main lighting unit provided with a plurality of LEDs as a light source and placed at a predetermined distance above a ground surface; and
an illuminating part for illuminating an area substantially vertically below the main lighting unit in white color while also illuminating the main lighting unit and/or the vicinity thereof in blue color.

2. The outdoor illuminating device as recited in claim 1, wherein the illuminating part comprises a first illuminating part for emitting illumination light of white-tint color downward in the direction substantially vertical from the main lighting unit, and a second illuminating part for emitting illumination light of blue-tint color to the outside of the area substantially vertically below the main lighting unit.

3. The outdoor illuminating device as recited in claim 2, wherein the first illuminating part is provided with white LEDs serving as the light source.

4. The outdoor illuminating device as recited in claim 2, wherein the second illuminating part is provided with blue LEDs serving as the light source.

5. The outdoor illuminating device as recited in claim 2, wherein the second illuminating part is disposed in a continual fashion along the periphery of the first illuminating part.

6. The outdoor illuminating device as recited in claim 2, wherein the second illuminating part is disposed at two confronting sides of the first illuminating part.

7. The outdoor illuminating device as recited in claim 1, wherein the main lighting unit is fixed directly to a post.

8. The outdoor illuminating device as recited in claim 1, wherein the main lighting unit is fixed to a post with a mounting fixture having an adjustable means for changing an angle of the main lighting unit relative to the ground surface.

9. The outdoor illuminating device as recited in claim 1, wherein a plurality of the main lighting units are fixed to one post in a manner that each of the main lighting units is positioned at a different predetermined distance in height from the ground surface.

10. The outdoor illuminating device as recited in claim 1, further comprising an automatic electric storage means provided with a photovoltaic cell.

11. The outdoor illuminating device as recited in claim 1, wherein the illuminating part comprises a first illuminating part for mainly illuminating the ground surface substantially vertically below the main lighting unit in white color, and a second illuminating part for mainly illuminating the main lighting unit and/or the vicinity thereof away from the ground surface in blue color.

12. An illuminating method for simultaneously emitting at least two different colors of illumination light, the method comprising the steps of:
employing an illuminating part having a plurality of LEDs as a light source and disposed in a main lighting unit placed at a predetermined distance above a ground surface; and
illuminating an area substantially vertically below the main lighting unit in white color while also illuminating the main lighting unit and/or the vicinity thereof in blue color.

* * * * *

UNITED STATES PATENT AND TRADEMARK OFFICE
CERTIFICATE OF CORRECTION

| | |
|---|---|
| PATENT NO. | : 8,267,541 B2 |
| APPLICATION NO. | : 12/445990 |
| DATED | : September 18, 2012 |
| INVENTOR(S) | : Kyozo Watanabe et al. |

It is certified that error appears in the above-identified patent and that said Letters Patent is hereby corrected as shown below:

Column 10 line 59, after "as" please insert therefor --$0° < \theta \leq 90°$--

Column 10 line 62, delete "21" and insert therefor --11--

Column 10 line 63, delete "23" and insert therefor --13--

Column 10 line 64, delete "21" and insert therefor --11--

Column 10 line 65, delete "24" and insert therefor --14--

Column 10 line 66, delete "21" and insert therefor --11--

Column 10 line 67, delete "23" and insert therefor --13--

Column 11 line 10, delete "21" and insert therefor --11--

Signed and Sealed this
Twenty-seventh Day of November, 2012

David J. Kappos
*Director of the United States Patent and Trademark Office*